Feb. 20, 1962    M. J. BAUER ET AL    3,022,031
MISSILE VIBRATION DAMPENER AND SUPPORT
Filed Feb. 1, 1960    3 Sheets-Sheet 1
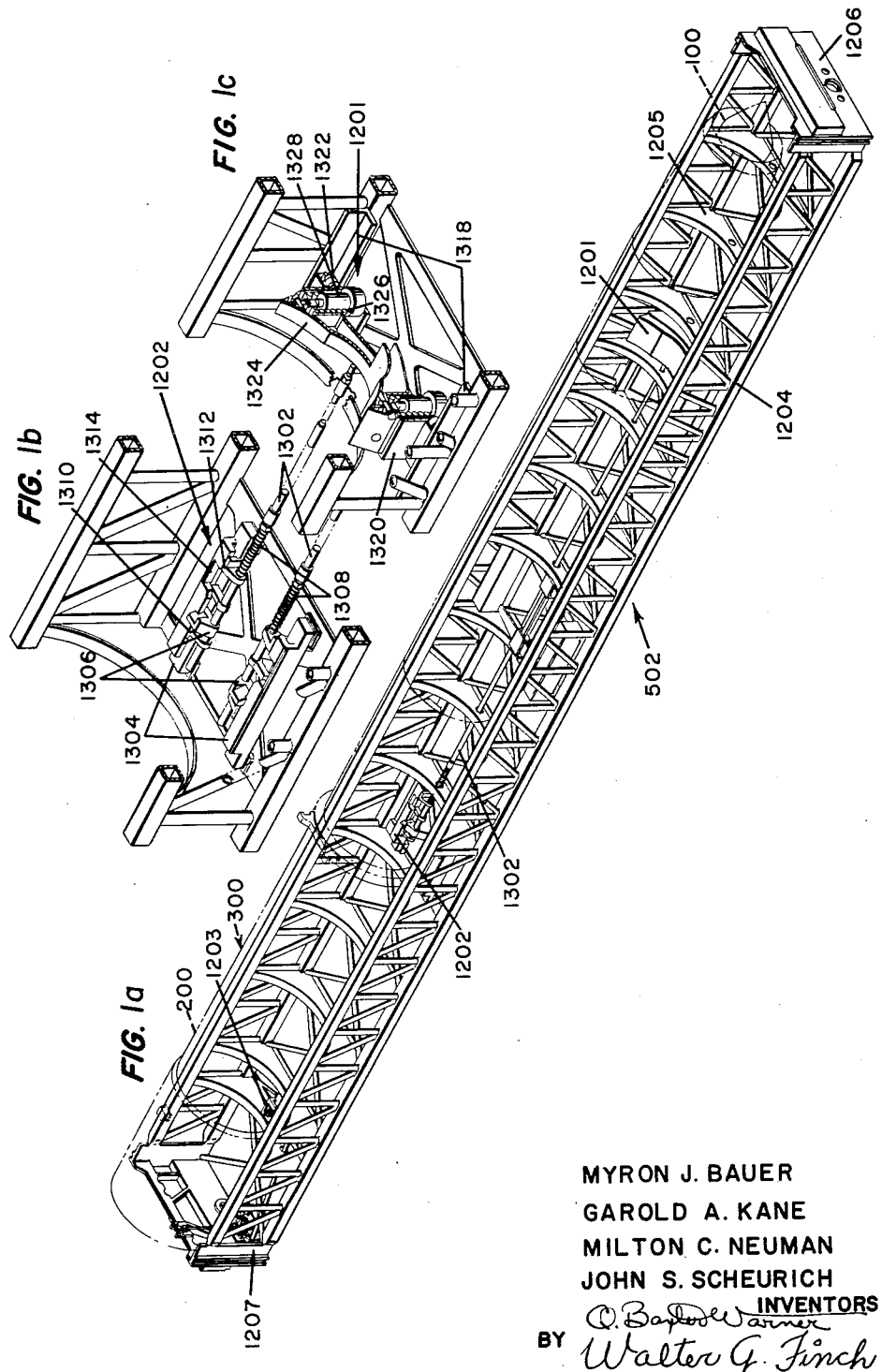
MYRON J. BAUER
GAROLD A. KANE
MILTON C. NEUMAN
JOHN S. SCHEURICH
INVENTORS
BY Walter G. Finch
ATTORNEYS

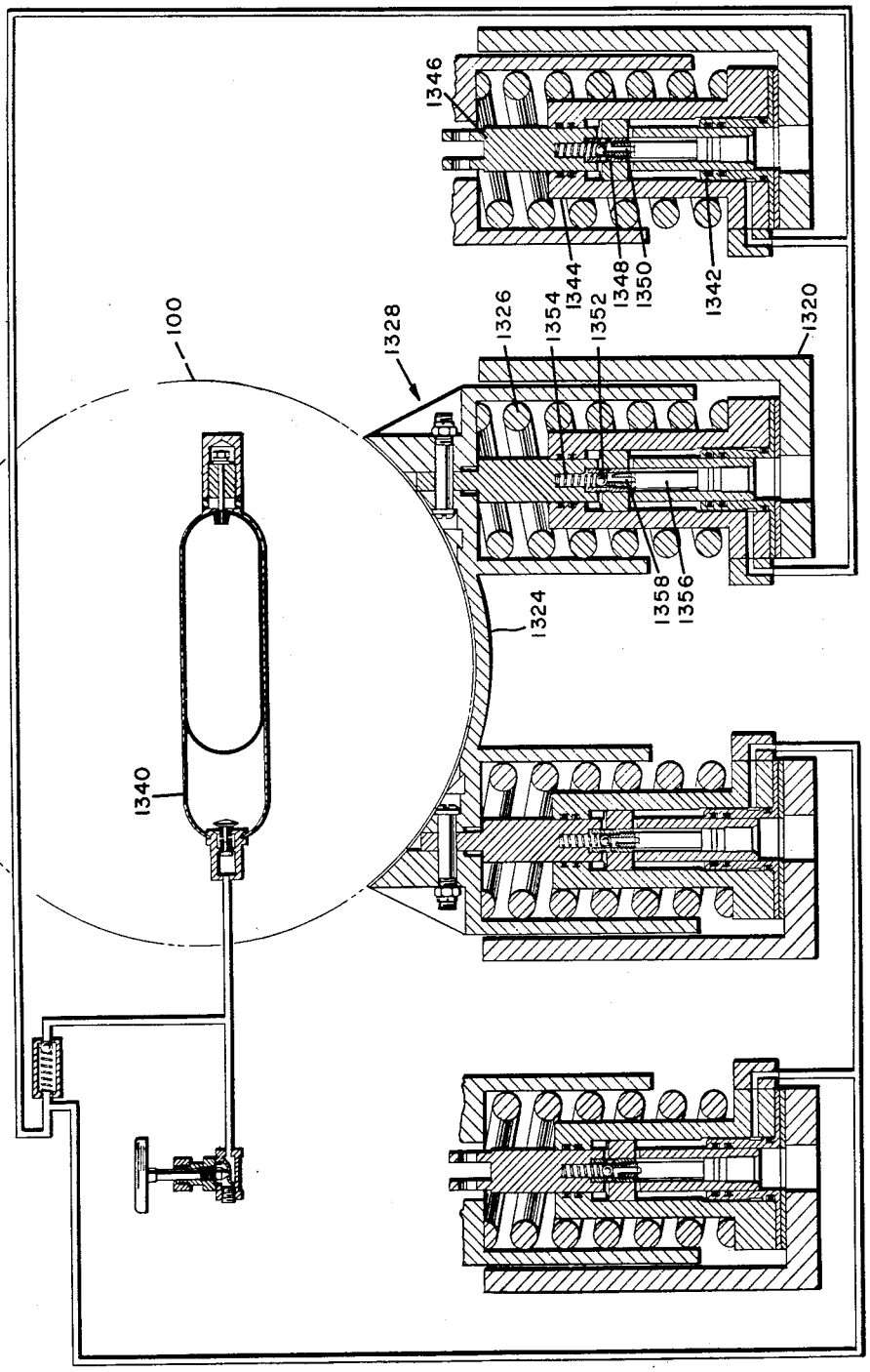

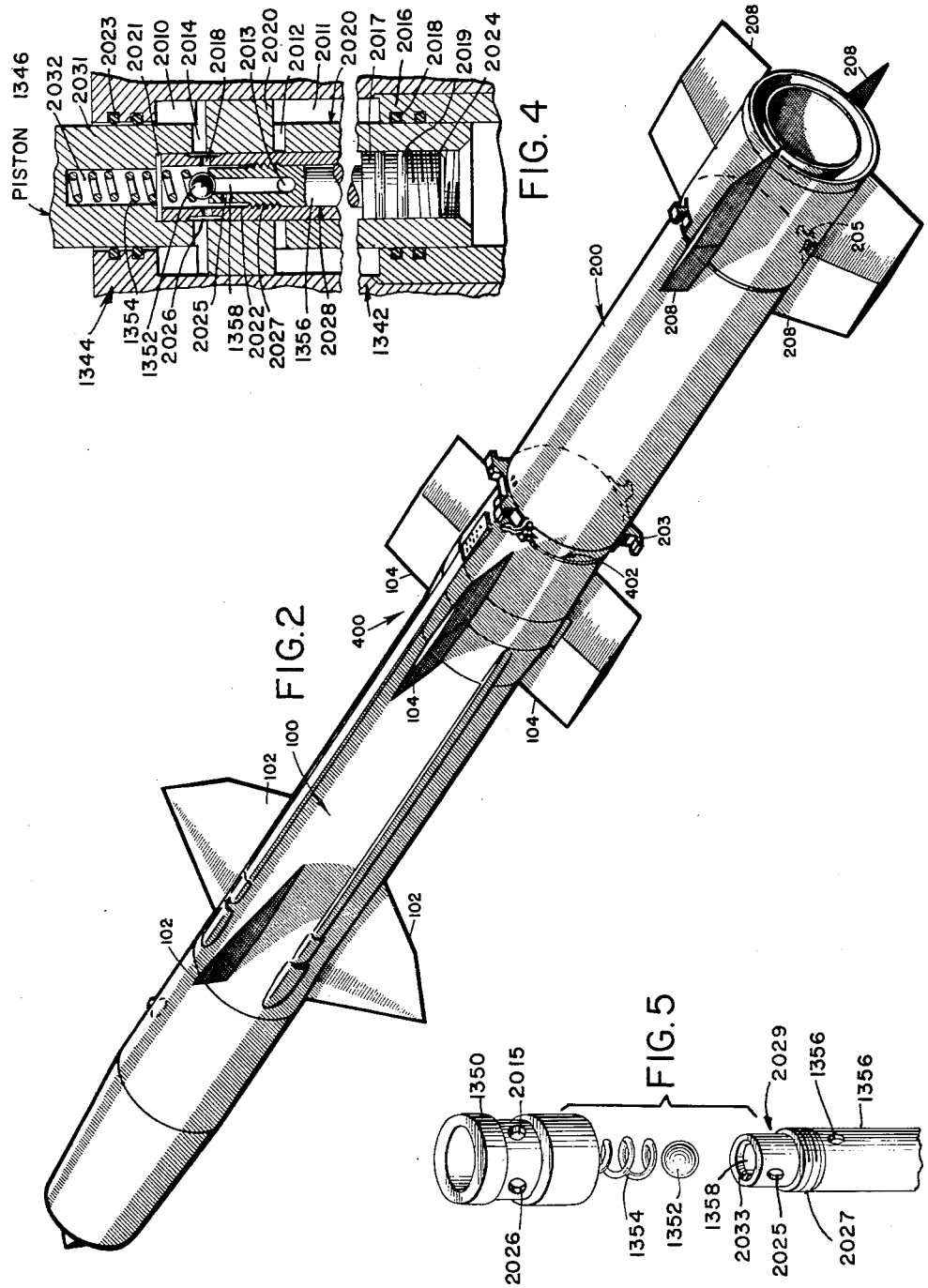

United States Patent Office 3,022,031
Patented Feb. 20, 1962

3,022,031
MISSILE VIBRATION DAMPENER AND SUPPORT
Myron J. Bauer, St. Paul, Garold A. Kane, Minneapolis, Milton C. Neuman, Champlin, and John S. Scheurich, Minneapolis, Minn., assignors, by mesne assignments, to the United States of America as represented by the Secretary of the Navy
Filed Feb. 1, 1960, Ser. No. 6,083
3 Claims. (Cl. 248—119)

This invention relates generally to supports, and more particularly it pertains to a combined article engaging support and vibration dampener therefor. It relates particularly to a support for a composite article having a joint along its axis and supporting one part of the composite article with securing means so as to make that part positively locked while the other part is left unsecured and supported only by a cradle-type structure leaving it free to vibrate and thereby place great stress upon the joint. The invention is intended to prevent the breaking of this joint due to the vibrational excursions and differences in vibration of the unsecured portion of the composite article in a manner which at once damps out the excursions of both parts of the composite article and tunes the movement of the unsecured portion to that of the secured portion whereby their movement is substantially unitary and tuned so that there is little or no stress on the joint between the two.

Modern missile type weapons are, of necessity, greatly elongated compared to their diameters. Therefore, specially designed handling devices are required for the storage and movement thereof to a launching station. The handling devices are faced with the problem of mounting and supporting a composite missile package with a junction between the two parts which joint must be protected from stress. There is the further problem that at least one of the portions of the missile package must be left without any securing means attached to its surface for the reason that this surface must be kept aerodynamically smooth. Therefore, the missile package load takes the form of a composite elongated package one part of which is relatively, firmly secured in the container, and the other portion of which is left to vibrate in the up and down direction and is held only by a cradle beneath that portion. It is evident that any vibration on the structure will cause a pitching of the missile and the unsecured aerodynamically smooth part of the missile will tend to move with much greater excursions than the secured portion thus placing a stress on the joint between the two. This type of "over-hung" load will only serve to magnify the vibrational forces on the unsecured part and thus present a stress problem on the joint. The present invention directs itself to the problem of protecting the joint by at once damping out the excursions of the unsecured portion of the composite load and also tuning those vibrational motions to that of the secured portion so as to keep them moving as a unitary body and with no difference in vibrational motion. Thus, the invention essentially tunes the vibrational movement of the secured and unsecured portions of the composite missile load. In addition, this tuning of secured to unsecured portions provides a counterweight in the form of the secured portion to the movement of the unsecured portion thereby using its weight and the weight of the launcher to which it is secured as a counterweight to help assist in damping out the vibrational motion of the unsecured portion.

For example, in a co-pending patent application entitled "Guided Missile Launching Systems," Serial Number 848,163 filed October 22, 1959, by Myron J. Bauer et al., there is described a handling system for a long booster-launched missile weapon.

A characteristic of a missile weapon of this type is the separable junction between the booster and the missile which make up the weapon. In storage and handling of the missile-booster combination great care is needed in order to avoid overstrain on this junction of the missile and booster. When the missile-booster combination is supported only at the booster shoes and oriented in an essentially horizontal direction, vibrations imparted in a vertical or lateral direction at a frequency near the resonant frequency of the overhanging unsupported missile, may result in vertical or lateral excursions of such magnitude as to overstress or cause breakage of the missile section near the mating joint of the missile and booster.

Support and handling shoes are usually not placed on the missile portion of the weapon in order to keep it aerodynamically smooth. For this reason, a saddle type supplementary support is required. However, certain handling procedures during storage require lengthwise shifting of the weapon while cradled within such a saddle support.

It is, therefore, an object of the invention to provide an engaging support for an elongated shaped article, such as a missile weapon which provides for strain-free longitudinal movement of the article.

Another object of this invention is to provide an additional spring rate to an overhung missile of a missile-booster combination positioned in a tray, such that the additional spring rate when added to the spring rate of the missile itself would tune the natural frequency of the missile and a saddle support in the tray to the natural frequency of the missile-booster tray combination, thereby causing the missile to function as an inertia dampener to prevent excessive missile-booster tray vibration amplitudes when vibration is imparted thereto.

Another object of this invention is to provide a protection arrangement for use in preventing the overstressing of a missile mating joint section of a missile-booster combination positioned in a tray under shock loading of the missile-booster tray combination, that is, as shock deflects the missile-booster tray combination, the loading at the missile mating joint section is limited to a maximum safe value.

And another object of this invention is to provide a cradling support in an article handling tray.

In accordance with the invention, a slidable tie rod mechanism which joins a missile support saddle with a forward booster shoe engaging receptacle is provided in a tray which is used to store and handle said missile weapon. In preparation for storage, the missile weapon (without aerodynamic surfaces) is lowered in the tray until it rests with its missile portion in the support saddle, and with its booster forward shoe located within the engaging receptacle.

The entire weapon including the saddle is then slid lengthwise until the engaging receptacle surrounds the forward shoe and in conjunction with an aft shoe receptacle for an aft booster support shoe is locked in place. The support saddle, not being equipped with clamps or strap for the missile, is further called upon to prevent destructive resonance vibration from building up. The saddle support, with a properly designed spring rate causes the missile and saddle support to function as an inertia damper to the missile-booster tray combination. Hydraulic pistons associated with the support saddle in conjunction with check-relief valves and a fluid pressure accumulator function to provide velocity damping under vibration and missile protection under shock.

Many other objects and attendant advantages of this invention will become more readily apparent as the same becomes better understood by reference to the following detailed description when considered in connection with the accompanying drawings wherein:

FIG. 1a is an isometric view of a tray assembly, with dot-dash lines showing a missile-booster combination, without aerodynamic surfaces, in place in the tray assembly;

FIG. 1b is a detailed isometric view of a portion of a forward shoe receptacle, partly in section, in latched position in the tray assembly;

FIG. 1c is a detailed isometric view, partly in section, of a missile vibration dampener for the tray assembly;

FIG. 2 is a perspective view of a missile weapon including the aerodynamic surfaces assembled thereto after being transferred from the tray assembly;

FIG. 3 is a hydraulic schematic showing details of a missile vibration dampener;

FIG. 4 is a sectional view of the valve mechanism in the damping support device; and FIG. 5 is an exploded perspective view of the valve ports and the ball and spring valve used therewith.

Referring now to FIGS. 1a to 1c, inclusive, of the drawings, the trays 502 are elongated, rigid, basket-like structures with rollers and skids at their ends which are adapted for sideways travel and hoisting in a ready service mechanism not shown but described in the patent application referred to above.

The ready service mechanism basically, is an intermediate storage and ready access arrangement for ordnance weapon articles, such as missile-booster combinations 300, each formed of a missile 100 and a booster 200, held together by a clamping ring 402, shown in FIG. 2. In essence, the ready service mechanism supports and handles a plurality of the trays 502. Each tray 502 contains one mated missile-booster combination 300. As shown in FIG. 2, each missile-booster combination 300 consists of the missile 100 and the booster 200 secured together by the clamping ring 402. When the wings 102 and fins 104 are mounted on the missile 100 and fins 208 to the booster 200, the missile-booster combination 300 becomes a missile weapon 400.

The missile-booster combination 300 is secured in the bottom of the tray 502 by lower booster forward and aft shoes 203 and 205, respectively, as shown in phantom in FIG. 2. The missile 100 is cradled intermediate its ends in the tray 502 but is not secured thereto. This means that the missile-booster combination 300 is supported at three places in the tray 502, namely, at the lower booster aft shoe 205, at the lower booster forward shoe 203, and at a missile support cradle or vibration dampener 1201.

In function, the trays 502 operate as an integral part of the ready service mechanism supporting the missile-booster combination 300 and restricting any movement, with respect to the trays 502, during an indexing operation of the ready service mechanism.

Each tray 502, as shown in detail in FIG. 1a, consists of a tray truss frame or weldment 1204, to which is mounted an aft shoe receptacle and latch 1203, a forward shoe receptacle 1202, and the vibration dampener 1201 for the forward support of the missile 100 of the missile-booster combination 300.

The tray 502 consists of the elongated rectangular all-steel weldment or truss frame 1204 formed by four horizontal rails which are joined by tubing. Except for the ends 1206 and 1207, the tray 502 is of an open frame construction, as shown in FIG. 1a.

In addition to the tubing, the tray 502 is braced by a plurality of spaced crescent-shaped plates 1205 which are vertically welded inside the tray. These plates 1205 are used as brace plates and they do not support the missile 100 or booster 200.

The forward booster shoe receptacle 1202, illustrated in FIG. 1b, is located in the tray 502 at the position shown. It is physically connected to the vibration dampener 1201 by two carrier rods 1302. The forward shoe receptacle 1202 operates with a latching type aft shoe receptacle 1203 of the tray 502 to receive the lower forward and aft shoes 203 and 205 of the booster. It supports the missile-booster combination 300 at its center support point in the tray 502. The forward booster shoe receptacle 1202 provides a bearing surface for the lower forward shoe 203 and restricts movement at this point of the missile-booster combination 300 in the tray 502 in a vertical and lateral direction when the aft shoe 205 is in latched position. The aft shoe 205 when in a latched position restricts movement at this point of the missile-booster combination 300 relative to the tray 502 in all three mutually perpendicular directions, thereby preventing longitudinal motion of the forward booster shoe 203 at the forward booster shoe receptacle 1202.

The components of the forward shoe receptacle 1202, as shown in FIGS. 1a, 1b, and 1c, are left-hand and right-hand forward shoe tracks 1304, left-hand and right-hand carrier links 1306, two compression springs 1308, and a pair of front and rear carrier link brackets 1312 and 1310, respectively, all mechanically associated as shown. The carrier links 1306 are connected to the vibration dampener 1201 by means of the carrier rods 1302.

The carrier links 1306 are supported by the front and rear carrier link brackets 1312 and 1310. The brackets 1312 and 1310 are anchored to the shoe tracks 1304 with the carrier links 1306 being arranged to move back and forth thereon. A U-shaped part on the carrier links 1306 also travels in the shoe track 1304. The compression springs 1308 on the forward end of the carrier links 1306 keep the vibration dampener 1201 and carrier links 1306 in their forward positions when the tray 502 is empty of a missile-booster combination 300.

When the tray 502 is empty, the carrier links 1306 on the forward shoe receptacle 1202 are located in the forward position, butted against the front carrier link brackets 1312. These links 1306 are maintained in this position by the compression springs 1308 located at the front of the receptacle 1202. In this position, the U-shaped part on the carrier link 1306 is aligned with an entry-exit slot or receptacle 1314 in the shoe track for the forward booster shoe 203.

When the tray 502 is being loaded with a missile-booster combination 300, the latter is horizontally lowered into the tray 502. The outboard ends of the lower forward booster shoe 203 enter the rectangular-shaped openings formed by the carrier links 1306 and shoe track slots 1314. The missile-booster combination 300 is then lowered until the forward booster shoe is supported by the shoe tracks 1304.

The missile-booster combination 300 is then moved aft in the tray 502. The carrier links 1306 and outboard ends of the forward booster shoe 203 are thus moved aft in the shoe tracks 1304. All lateral movement of the forward booster shoe 203 is restricted by the shoe tracks 1304. Any fore and aft movement of the missile-booster combination 300 in the tray 502 is restricted by the aft booster shoe receptacle and latch 1203, as shown in FIG. 1a.

The compression springs 1308 on the front of the carrier links 1306 are then compressed. These springs 1308 are compressed against the front carrier link brackets 1312 by the carrier rods 1302. When the tray 502 is empty of a missile-booster combination 300, these springs 1308 hold the carrier links 1306 in their forward position.

When the tray 502 is to be unloaded of its missile-booster combination 300, the latter combination 300 is moved forward. At the end of the forward movement of the missile-booster combination 300, the lower forward booster shoe 203 is at the exit slots 1314 in the shoe tracks 1304 and the shoe 203 of the missile-booster combination may be raised out of the receptacle 1202.

The missile vibration dampener 1201, shown best in FIG. 1c, is the forwardmost component in the tray 502. It is physically connected to the forward shoe receptacle 1202 by the two carrier rods 1302. The missile vibration dampener 1201, also referred to as the forward support, supports the missile 100 of the missile-booster combination 300 in the ready service tray 502. It functions to provide support for the missile 100, reduce the vibration amplitude of the missile-booster tray combination, and shock protection to the missile 100. Dampener 1201 is physically conncted to the forward shoe receptacle 1202 and moves fore and aft with it.

The missile vibration dampener 1201 consists essentially of a left-hand and a right-hand track 1318 which supports the dampener 1201 and allows it to move fore and aft. An outer housing 1320, which forms the base for all the other components is provided for the missile vibration dampener 1201, and it is mounted to the tracks 1318 by rollers 1322.

An inner housing 1324, which makes physical contact with the missile 100 is also provided and it is connected to the outer housing 1320 through four coil springs 1326 and four piston assemblies 1328. The piston assemblies 1328 are hydraulically connected to a small accumulator 1340, shown schematically in FIG. 3, which is horizontally mounted on the aft end of the dampener 1201.

Two piston assemblies 1328 are located in each side of the dampener 1201, one behind the other, as shown in FIG. 3. The coil spring 1326 is mounted over each piston assembly 1328. Except for left-hand and right-hand locations, the piston assemblies 1328 are the same and each consists, as shown in FIG. 3, of two sleeves 1342 and 1344 anchored in the bottom of the outer housing 1320.

A piston 1346 fits into both sleeves 1342 and 1344 and it is anchored to the inner housing 1324 at the top thereof. The inside of the piston 1346 contains an orifice 1348, an orifice sleeve 1350, a ball 1352, and a spring 1354. A plug 1356, which is threaded into the bottom of the piston 1346, has a valve stem 1358 formed on it. The plug 1356 supports the orifice 1348, and the sleeve 1350 and holds them in place.

The damping valve system as best shown in FIG. 4 is in essence a system whereby the damping piston is damped hydraulically by a valve device, one port of which is regularly open and the other port of which will open only under emergency loads to provide a shunt whereby an extra fluid may be provided under extreme loads.

In the valve assembly, plug 1356, which is inserted within the piston 1346, acts as a support for the valve ports. The valve ports inclue port 2025 which is regularly open for passing fluid which enters the piston assembly in the annular cavity at the bottom 2011 flows through passage 2012 into annular cavity 2028 and thence around the plug and through the port 2013 therein and up the length of the plug along channel 1358 in the valve stem. The fluid then passes from port 2025 outwardly along the reduced portion of plug 1356, namely portion 2029 which creates annular cavity 2022 through which the fluid may flow, thence to the top side of piston head 2030 and outwardly through ports 2015 in orifice sleeve 1350. The fluid now on the top side of piston head 2030 may flow outwardly from the inset cavity provided by inset 2026 in orifice sleeve 1350 through the passages 2014 and the piston 1356 and into the damping annular cavity 2010 above the piston head 2030. At this point the damping fluid is in its operative damping position to oppose the upward movement of piston head 2030. It will be realized that such a damping effect is accomplished for the downward excursion of piston head 2030 by a traversal in the opposite direction from that previously described of the hydraulic damping fluid. In this way fluid in the top damping cavity 2010 may traverse the valve system in reverse order as described above to present itself from the bottom damping cavity 2011 and thus support and damp the downward movement of piston head 2030.

The piston assembly is sealed in its supporting environment by O-rings. O-rings 2023 seal the upper shaft of piston 1346, namely shaft 2031, to the outer sleeve 1344. Lower O-rings 2018 seal the lower shaft of piston 1346, namely 2020, to the lower supporting sleeve 2016. In this manner, hydraulic fluid is kept within the damping cavities while, at the same time, the piston shaft is allowed to move along the surface of the supporting walls. Plug 1356 is secured to the lower piston shaft 2020 inside of which it is mounted at securing portion 2024 which may be a thread as shown or alternatively could be a weld or soldered joint. O-rings 2019 to maintain a secure fit and keep the hydraulic fluid within its chamber are provided along the plug wall.

The outer sleeve fitting onto the head of the plug at its valve port portion will be noted, perhaps best seen in FIG. 5, to be of an annular cylindrical shape having ports disposed about its walls 2015 in an inset portion of the cylinder 2026. This sleeve fits into its cavity 2021 and is threadably secured to the upper portion of the plug at 2027. This threaded joint allows the sleeve to be secured at adjustable positions along the top of plug 1356 so that a valve adjustment may be effected by adjusting the length of the sleeve. This adjustment is effected by adjusting the position of ports 2015 in relation to passages 2014. The position of sleeve 1350 along the top of plug 1356 will determine the width of the opening between these ports 2015 and 2014 and thus determine the size of the orifice through which the hydraulic fluid flows and hence the speed of damping which is proportional to the speed of flow of the damping fluid.

An auxiliary overload valve to provide extra fluid to damp out extra heavy loads is provided in a form of ball 1352 sitting on top of plug 1356 to open the port 1358. The load at which the ball will move upward and open the port 1358 is determined by the stress of spring 1354 which is biased against the top shaft 2031 in a cavity 2032 within which spring 1354 is seated, by plug 1356 which when threaded onto piston shaft 2020 at point 2024 urges the ball against the spring and the spring against the top of the piston thereby presenting a bias on the wall. Thus, the load at which the auxiliary port 1358 will open may be adjusted and in this way the point at which an overload will effect an auxiliary amount of damping fluids may be preset according to the length and tension of spring 1354 and the stress put on it by the insertion of plug 1356 at point 2024. FIG. 5 best illustrates the manner in which ball 1352 is seated in port 1358 by a tapering of the inner wall at 2033 of reduced portion 2029 of plug 1356.

Thus, it may be seen that, under an extreme vibration load, ball 1352 will be pulled away from port 1358 to a greater or lesser extent and allow an auxiliary amount of damping fluid to provide extra damping. For example, under an extreme downward force on piston 1356, piston head 2030 would move rapidly in a downward direction carrying plug 1356 and compressing the fluid in lower damping chamber 2011 causing it to seek the upper chamber 2010 now being evacuated and passing through valve stem 1358 will exert an upper force on ball 1352 and force it upward and allow fluid to pass out of port 1358 as well as port 2025 on the plug to provide a large amount of fluid in tip damping chamber 2010 to oppose the upward movement of piston 2030.

In summary, when a missile-booster combination 300 is loaded into a tray 502, it is supported at three places, namely by the lower forward and aft shoes 203 and 205 of the booster in the receptacles 1202 and 1203 and by the vibration dampener 1201 beneath the central part of the missile 100. The previously mentioned four coil springs 1326 in the dampener 1201 support the weight of the missile 100 of the missile-booster combination 300. Each coil spring 1326 is mounted over the piston assembly 1328 effectively in parallel, as shown in FIG. 3.

In the piston assemblies 1328, the ball 1352 is spring-loaded by the spring 1354 and it acts as a relief valve in one direction. The ball 1352 is set to open at 3000 p.s.i., thus limiting loading at the missile mating joint section under downward tray deflections imparted by shock. During normal operating conditions, the fixed orifice 1348 in each piston assembly 1328 allows the hydraulic fluid to pass from one side of the piston 1346 to the other, functioning as a velocity damper.

In the event of a high impact shock, when the hydraulic pressure on the bottom of the piston 1346 exceeds 3000 p.s.i., it unseats the ball 1352. This allows other hydraulic fluid in addition to that of the fixed orifice 1348 to enter the chamber at the top of the piston 1346. When the pressure on the bottom of the piston 1346 drops to below 3000 p.s.i., the ball 1352 reseats on the top of the orifice plug 1356. Any hydraulic fluid returning to the bottom of the piston 1346 must pass through the fixed orifice 1348 below the ball 1352.

Obviously many modifications and variations of the present invention are possible in light of the above teachings. It is, therefore, to be understood that within the scope of the appended claims the invention may be practiced otherwise than as specifically described.

What is claimed is:

1. In a loading and support structure for an elongated missile airframe part of which is secured to the structure, the combination therewith of a tray for supporting and storing said airframe, a support attachable to said airframe, a receptacle positioned in said tray for receiving said support, a saddle spaced from said receptacle and connected thereto for supporting an unsecured portion of said airframe and a vibration damper means positioned between said tray and said saddle and having spring support means for bearing the weight of said airframe, said damper means having a first hydraulic damping means linked to the secured portion of said airframe to damp out vibration of said unsecured portion and having a second auxiliary hydraulic damping means in shunt to and assisting said first hydraulic means in the latter's damping action at predetermined high vibration loads as well as assisting in tuning the vibration of said secured and unsecured portions of the said airframe, thereby to minimize stress and resultant airframe deformation.

2. The combination as recited in claim 1, wherein said first hydraulic means includes an orifice constantly open and said second hydraulic means includes a normally closed valve which is biased to open at a predetermined vibration load.

3. In a supporting structure for an elongated composite object, part of which is secured to the structure, the combination therewith of an elongated shaped tray for supporting said composite object having at least one connecting element to attach to one of the composite parts of said object, a damping saddle support secured to said tray so as to engage and support the unsecured portions of said composite object, damping means connected to said saddle so as to damp out any load displacements, overdamping means connected to said damping means so as to overload the damping operation in response to external thrust, counter-thrust means connected to said overdamping means and a secured portion of said composite object so as to make the supported object function as an inertia dampener upon the excursions of the unsecured portion of the objects.

References Cited in the file of this patent

UNITED STATES PATENTS

| | | |
|---|---|---|
| 2,359,941 | Rosenzweig | Oct. 10, 1944 |
| 2,635,838 | Branson | Apr. 21, 1953 |
| 2,928,536 | Weaver | Mar. 15, 1960 |
| 2,933,183 | Koelsch | Apr. 19, 1960 |

FOREIGN PATENTS

| | | |
|---|---|---|
| 130,909 | Australia | June 16, 1949 |
| 137,831 | Austria | June 11, 1934 |